United States Patent [19]

Starkey, IV

[11] Patent Number: 4,757,239
[45] Date of Patent: Jul. 12, 1988

[54] CRT DISPLAY SYSTEM WITH AUTOMATIC ALIGNMENT EMPLOYING PERSONALITY MEMORY

[75] Inventor: Cornelius J. Starkey, IV, Lexington, Ky.

[73] Assignee: Hilliard-Lyons Patent Management, Inc., Louisville, Ky.

[21] Appl. No.: 789,107
[22] Filed: Oct. 18, 1985
[51] Int. Cl.[4] .............................................. H01J 29/56
[52] U.S. Cl. ...................................... 315/371; 358/60
[58] Field of Search ....................... 315/370, 371, 368; 358/60

[56] References Cited

U.S. PATENT DOCUMENTS

| | | | |
|---|---|---|---|
| 3,740,608 | 6/1973 | Manber et al. | 315/367 |
| 3,932,592 | 1/1976 | Todd, Jr. et al. | |
| 3,943,279 | 3/1976 | Austefjord | 315/368 |
| 3,959,584 | 5/1976 | Todd, Jr. | 313/465 |
| 3,968,394 | 7/1976 | Todd, Jr. | 313/465 |
| 4,035,525 | 7/1977 | Todd, Jr. | |
| 4,095,137 | 6/1978 | Oswald | 315/367 |
| 4,099,092 | 7/1978 | Bristow | 315/367 |
| 4,149,120 | 4/1979 | Richter | |
| 4,192,005 | 3/1980 | Kurtz | 364/571 |
| 4,203,051 | 5/1980 | Hallett et al. | 315/367 |
| 4,203,054 | 5/1980 | Sowter | 315/367 |
| 4,211,960 | 7/1980 | Barten et al. | 315/368 |
| 4,240,073 | 12/1980 | Seats et al. | 340/736 |
| 4,335,371 | 6/1982 | Connolly, Jr. et al. | 364/571 |
| 4,344,021 | 8/1982 | Johnston | 315/367 |
| 4,354,143 | 10/1982 | Judd | 315/367 |
| 4,356,731 | 11/1982 | Mahony | 364/571 |
| 4,385,259 | 5/1983 | Chase et al. | 315/368 |
| 4,387,404 | 6/1983 | Feinberg et al. | 358/237 |
| 4,388,828 | 6/1983 | Dougherty | 364/571 |
| 4,401,922 | 8/1983 | Kamata et al. | 315/368 |
| 4,414,638 | 11/1983 | Talambiras | 364/571 |
| 4,418,392 | 11/1983 | Hata | |
| 4,422,019 | 12/1983 | Meyer | 315/368 |
| 4,437,164 | 3/1984 | Branch, III | 364/571 |
| 4,441,057 | 4/1984 | Wrona | 315/367 |
| 4,446,715 | 5/1984 | Bailey | 364/571 |
| 4,451,824 | 5/1984 | Thayer et al. | 315/368 |
| 4,463,288 | 7/1984 | Judd | |

FOREIGN PATENT DOCUMENTS 1371045  10/1974  United Kingdom .

OTHER PUBLICATIONS

Paul C. Lyon, "A Wide Field-Of-View CRT Projection System with Optical Feedback for Self-Alignment", Evans & Sutherland Computer Corporation.
DataBeam Corporation brochure describing Model CT 2000 for high-resolution teleconferencing (1985).

Primary Examiner—Theodore M. Blum
Attorney, Agent, or Firm—Kerkam, Stowell, Kondracki & Clarke

[57] ABSTRACT

Disclosed are systems and techniques for alignment of CRT-based display systems, particularly those employing a high resolution cathodochromic projection CRT. The disclosed techniques permit all major CRT-related alignment to be performed at a factory or other centralized facility, with automatic precision alignment in the field of the overall display system, including a CRT assembly as one element. A replaceable, standardized CRT subsystem includes a CRT assembly, itself subject to sample variations, and a non-volatile personality memory, such as an EEPROM, having stored parameters specifically applicable to the CRT assembly on an individual basis. The CRT assembly has no field adjustable parts, but does include elements for electron beam control, such as electromagnetic coils for focus and deflection permanently affixed to the CRT. Thus at the factory, a skilled operator having appropriate equipment available performs an electronic alignment procedure with reference to a particular CRT. In the case of a projection display system, the CRT is mounted during alignment within an optical projection system which represents a standardized optical configuration, identical to the optical configuration in which the CRT will be operated in the field. Alignment parameters are digitally recorded as data in the non-volatile "personality" memory, which then applies specifically to that CRT assembly. When the CRT subsystem including the CRT assembly and the personality memory are later mated with the display electronics subsystem, the display electronic subsystem reads and correctly interprets the data from the personality memory to effect corrections tailored to that particular CRT. When field replacement of a CRT eventually becomes necessary, the replacement CRT is supplied with its own personality memory, which is plugged into the circuit in place of the original one.

16 Claims, 4 Drawing Sheets

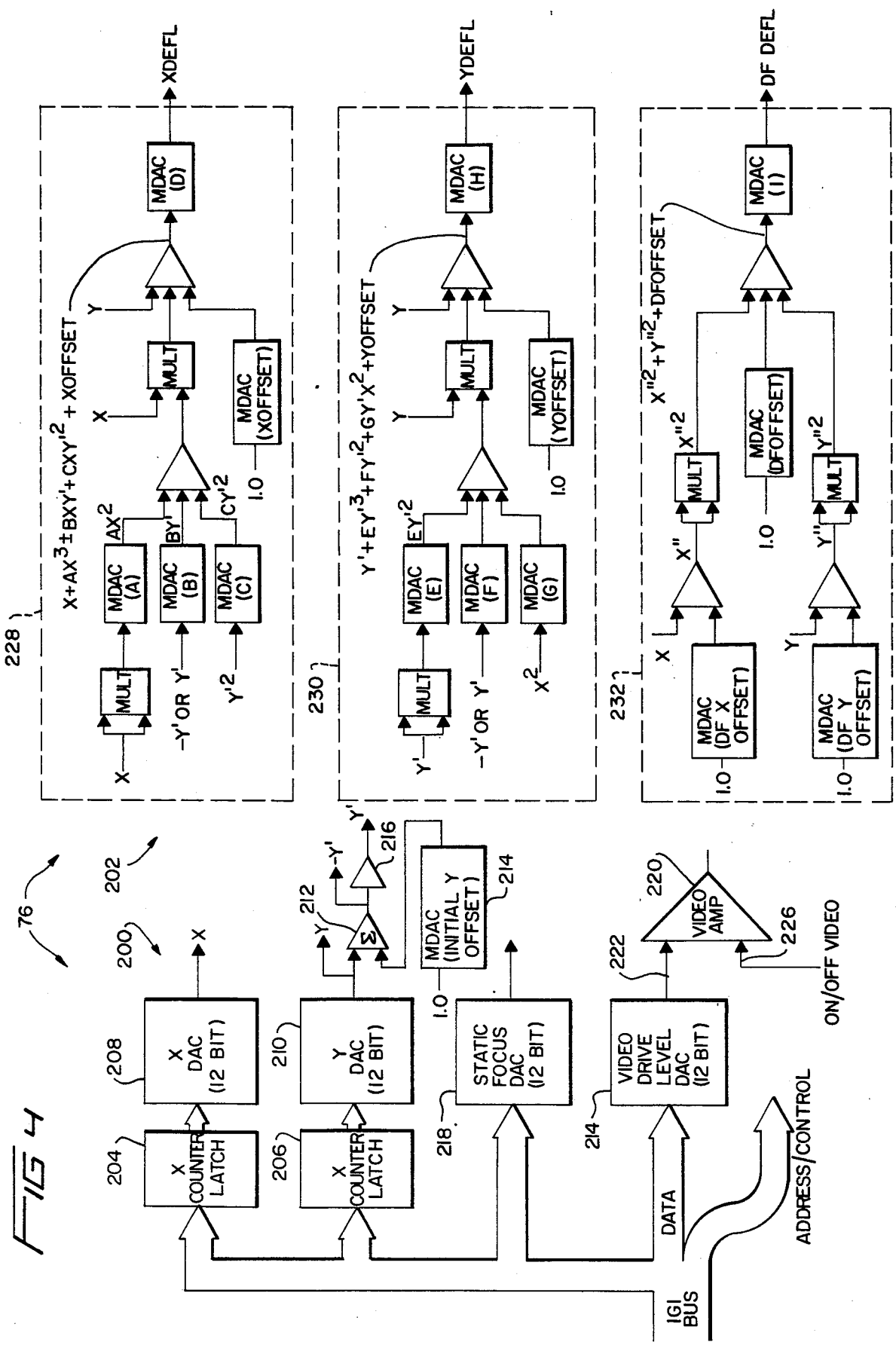

CRT DISPLAY SYSTEM WITH AUTOMATIC ALIGNMENT EMPLOYING PERSONALITY MEMORY

CROSS-REFERENCE TO RELATED APPLICATION

This is a companion to related application Ser. No. 788,838, filed Oct. 18, 1985, by Cornelius J. Starkey, IV, Hubbard B. T. Spencer, III, James P. Galvin, Jr., and Thomas J. McSorley, and entitled "Programmable Interlace with Skip and Contrast Enhancement in Long Persistence Display Systems", the entire disclosure of which is hereby expressly incorporated by reference.

BACKGROUND OF THE INVENTION

The present invention relates to techniques for alignment of CRT based display systems which permit all major CRT-related alignment to be performed at a factory or other centralized facility, with automatic precision alignment in the field of the overall display system including a CRT assembly as one element thereof. The invention particularly facilitates field replacement of a CRT assembly, while avoiding any requirement for a difficult field alignment procedure. While the invention is applicable to any CRT based display system, it is applicable in particular to a high resolution cathodochromic CRT projection display.

At this point, it may be noted that an image target on which an electron beam impinges in a cathodochromic CRT does not emit light as does an image target in a cathodoluminescent CRT. Rather, the cathodochromic materials employed change color when excited by an electron beam. In the case of an image target comprising cathodochromic bromine sodalite, the resultant coloration remains indefinitely, until deliberately erased. In addition to inherent memory, cathodochromic image targets have the properties of high resolution, and high contrast in bright ambient light making them highly suitable for projection systems.

Erasure of a cathodochromic image target is normally effected by heating to about 300° C. An economical and technically feasible erasure method is electron beam heating, wherein the image target is scanned, in a raster pattern, with an electron beam spot energy density such that temperature is raised above an erase threshold. While highly effective, electron beam erasure is a relatively critical operation in that the electron beam current and focus must be such as to achieve a sufficient energy for erasure, without reaching a damage threshold which causes permanent damage to the image target.

Processes for preparing cathodochromic sodalite and a cathodochromic CRT projection display are disclosed in Todd, Jr. et al U.S. Pat. No. 3,932,592 and Todd, Jr. U.S. Pat. No. 3,959,584, to which reference may be had for further details.

As is well known, replacement of a CRT in any display system normally requires an electronic alignment procedure in view of sample variations from one CRT to the next, even among CRTs of the same model or type number. This alignment problem is present, in one degree or another, in virtually all CRT based display systems, ranging from simple monochrome television sets through high resolution video data displays, including color video displays, as well as in projection CRT display systems, including cathodochromic CRT projection displays such as are disclosed in the aboveidentified Todd, Jr. U.S. Pat. No. 3,959,584. Alignment is generally a relatively time consuming iterative procedure normally involving a number of interdependent adjustments.

There are three major areas of electronic alignment involved in field replacement of any monochrome or cathodochromic CRT, namely: (1) electron gun drive (beam current) adjustment; (2) beam focus alignment; and (3) deflection/geometry correction. Color CRT systems in addition to these three require convergence alignment.

Of the three major areas identified above, electron gun drive (beam current) and beam focus are particularly critical ones in relatively higher power systems where energy imparted by an electron beam impinging on an image target within the CRT is close to the level which will cause permanent damage. Beam current and spot size (focus) together determine the energy density of the electron beam spot where the electron beam impinges on the image target. Assuming a simple raster scan pattern, scan speed and overlap from one line to the next will also affect heating. By way of example, assuming a 30 kV fixed anode voltage for accelerating the electron beam, for erasing a cathodochromic CRT image target the CRT is operated such that spot diameter is 10 mils and electron beam current is 500 microamperes. In contrast, for normal image writing, a typical spot size is 1.5 mils with an electron beam current of 50 microamperes.

Two particular situations where energy density of the electron beam spot is important are electron beam erasure of cathodochromic CRT projection tubes, and operation of high brightness cathodeoluminescent projection CRTs in general. For erasing a cathodochromic CRT, the CRT is typically operated such that the energy density of the electron beam spot is near the maximum allowable, but still below a threshold level at which damage results. The damage to be avoided is primarily an overheating effect, and is typically manifested by effects such as release of binder material holding active components of an image screen composition together, fusing of the image screen composition, damage to the chemical structure of the phosphor, or even faceplace cracking in some systems.

Proper electron beam current must of course be maintained at all times during operation. However, particular care must be taken during the alignment and adjustment process itself. Damage is most likely to occur at this point, since the adjustments are being manipulated. Manifestly, a high degree of skill is required to ensure that electron beam current does not reach the threshold level where damage results.

Briefly considering the second alignment area identified above, beam focus, in CRTs used in high resolution applications there is usually a provision for both static (center screen) focus and dynamic focus to maintain edge focus as close as possible to the center screen focus. Static focus is a simple adjustment in a monochrome CRT, and dynamic focus involves generally three or four interdependent adjustments that generate a signal which is summed either electrically or magnetically with the static focus level signal.

Briefly considering the third alignment area, deflection/geometry correction, due to the geometries involved in electron beam scanning of the CRT image area, a number of correction factors must be added to the basic horizontal and vertical deflection signals. The number of adjustments per axis ranges from a minimum of three to as many as twelve in high resolution projection applications. Geometry correction is significantly more complex for a projection display system compared to a direct-view CRT system because a projection optical system normally introduces distortions, such as trapezoidal and linearity distortion as a result of projection angle and lens design considerations, and these must be compensated for to achieve an aligned display as actually presented to a viewer.

Moreover, a cathodochromic CRT generally has multiple focus levels to accommodate different operating conditions such as writing and erase, while a cathodeoluminescent CRT normally has just one. Deflection and geometry correction correspondingly must change for different operating conditions of a cathodochromic CRT. For example, for writing in a raster-scan system, a well-focused spot scanning over a portion of the image target is required. This portion of the image target will generally be trapezoidal rather than rectangular to compensate for the optical geometry so that the ultimate projected image is rectangular. However, for electron beam erasure, the parameters for deflection/geometry correction should be set to achieve a uniform energy density over the entire image target, even outside the normal visible areas. Again, proper alignment is a critical and complex procedure, not easily done in the field.

Particularly in the context of the present invention, it is significant to note that the alignment requirements briefly discussed above can be further characterized as having two distinct sources: (1) display system design, including the geometry of projection optical systems; and (2) manufacturing or sample variations in both the electronics and the CRT itself from one particular unit to the next. Heretofore, manufacturing variations at least have necessitated that manual adjustments be provided to compensate, at field installation, for such variations. In more demanding applications, such as projection, high resolution, and combinations of both, it will be appreciated that the adjustment procedure becomes relatively sophisticated and complicated.

Evidencing the importance of proper alignment, particularly in high-resolution display systems, there have been a number of proposals directed to control and correction of CRT-based display systems, often employing digital techniques. For example, Paul C. Lyon, in "A Wide Field-of-View CRT Projection System with Optical Feedback for Self Alignment", Evans & Sutherland Computer Corporation, describes a multichannel color CRT projection system including a microprocessor-based subsystem involving optical feedback to provide self-alignment for color-hue, intensity, color-convergence, geometry, and focus. The article describes, by way of background, one general technique for geometry correction, namely, analog function generator circuitry to generate a correction polynomial as a function of X and Y screen position coordinates, with adjustable coefficients to adjust the weighting of each product term in the correction polynomial. In the actual implementation described in the Lyon article, a digital correction memory is used instead of analog function generator, and the various product terms of the correction polynomial are effectively locked together in the digital correction memory after being calculated and stored there by the microprocessor operating in an optical feedback mode.

Other CRT display systems which calculate correction polynomials based on stored constants, but which lack optical feedback for automatic correction as in the Lyon system, are disclosed in Judd U.S. Pat. No. 4,354,143 and Wrona U.S. Pat. No. 4,441,057.

As another example, Chase et al U.S. Pat. No. 4,385,259 discloses a dynamic convergence compensation system for a shadow mask color CRT display wherein "coarse" compensation is provided by analog circuitry which generates primary terms of a polynomial and "fine" compensation is provided by digital PROMs, in which are stored representations of the coefficients of remaining terms of the polynomial. While Chase et al describe several different adjustment techniques, of particular note in the context of the present invention is one where a CRT and its associated deflection coils are supplied "as a precalibrated unitary assembly from a manufacturer." The manufacturer also supplies a set of recommended convergence waveforms he has established for the particular unit. Based on a study of these curves, correction currents are determined and employed to adjust the values of certain resistors in the analog circuitry and to determine the contents of the PROMs.

Yet another example of circuitry for digital control and correction of signals used to drive a CRT is disclosed in Hallett et al U.S. Pat. No. 4,203,051. In this particular system, the electronics for generating the deflection waveforms for a color CRT includes a pair of memories. The first memory is a basic waveform store from which is derived the basic waveform which controls the convergence of all three color beams. The other memory is an error correction store from which are derived correction currents for finer adjustment. It appears that the basic waveforms are determined "for each CRT during manufacture", while the data for the error correction memory are determined during a field adjustment procedure.

In Bristow U.S. Pat. No. 4,099,092 a display alignment technique is described where a centralized test station is used for precision alignment of a display system as a whole, and the results are stored in a PROM. During later operation in actual use, data are read from the PROM to generate correction signals. A similar technique is disclosed in Kamata et al U.S. Pat. No. 4,401,922, wherein circuitry determines correction values for a display system, and stores the correction values in a PROM.

These and various other prior art approaches in general do not address the problems of field-replacement of components in a high resolution display system, particularly projection display systems including cathodochromic CRTs. As noted above, there are two distinct sources of alignment requirements, display system design and manufacturing or sample variations, and field adjustments are normally required following component replacement. Adjustment of a cathodochromic CRT projection system requires particular sophistication, due both to the very real possibility of damage if the electron gun drive is improperly adjusted, and to the fact that it is difficult to observe the effects of adjustment changes on a test pattern because an image, once written, remains until it is erased. Thus, it is difficult to determine which lines of a test pattern are currently being written and which are left from previous adjustments Exacerbating this difficulty, a cathodochromic CRT cannot generally be erased until a basic alignment has been done such that the electron beam can be properly directed and controlled for erase. Thus, again, alignment requires sophistication and equipment not generally available in the field. As a further complication, alignment is different for various modes of operation, and thus may need to be changed even while the system is operating.

SUMMARY OF THE INVENTION

It is an object of the invention to provide an automatic alignment mechanism for CRT based display systems which permits all major CRT related alignment to be performed at a factory or other centralized location where appropriate alignment equipment and expertise are available.

It is another object of the invention to remove sample or manufacturing variations from one CRT to the next as a factor in the overall alignment process.

It is a related object of the invention to make the CRT a standard part of the system such that it can readily be replaced as a field service operation, requiring relatively minor adjustments, if any.

It is another object of the invention to provide a CRT based display system generally comprising a CRT subsystem and a display electronics subsystem such that any CRT subsystem and any display electronics subsystem can be mated and the overall system will self-calibrate and align itself to remove the effect of sample differences in both units.

In accordance with the invention, a replaceable, standardized CRT subsystem is provided which includes a CRT assembly, itself subject to sample variations, and a nonvolatile personality memory having stored parameters specifically applicable to the CRT assembly on an individual basis. The CRT assembly has no field adjustable parts, but does include elements for electron beam control. By way of example, these elements for electron beam control include electromagnetic coils for focus and deflection permanently affixed to the CRT, along with various other CRT mounted components such as beam centering magnets and astigmatism correctors. At the factory, or other centralized alignment facility, a skilled operator having appropriate equipment available performs an electronic alignment with reference to a particular CRT. In the case of a projection CRT or cathodochromic CRT display system, the CRT is mounted during alignment within an optical projection system which represents a standardized optical configuration. The electronic alignment encompasses geometry corrections, and so may be viewed as relating to both the electrical and mechanical characteristics of the system. Alignment parameters may be determined for more than one geometrical configuration. The alignment parameters are digitally recorded as data in a non-volatile "personality" memory, which then applies specifically to that CRT assembly.

When the CRT subsystem including the CRT assembly and the personality memory are later mated with the display electronics subsystem, the display electronic subsystem reads and correctly interprets the data from the personality memory to effect corrections tailored to that particular CRT. When field replacement of a CRT eventually becomes necessary, the replacement CRT is supplied with its own personality memory, which is plugged into the circuitry of the display electronics subsystem in place of the original one.

More particularly, in accordance with one embodiment of the invention, a CRT based display system for presenting an aligned visual display includes a replaceable standardized CRT subsystem, itself including a CRT assembly and a non-volatile personality memory, both as briefly described above. It will be appreciated that the CRT assembly and the personality memory, while corresponding to each other, are not necessarily physically together. The system additionally includes a display electronics subsystem electronically connected for reading parameters from the personality memory and for driving the elements of the CRT assembly while taking the parameters into account so as to generate a properly aligned image display regardless of sample variations specific to the CRT assembly.

In the case of a projection system, the system further includes projection optics for projecting an image formed by the CRT assembly onto a viewing screen, and the projection optics has a standardized optical configuration. The CRT assembly includes mechanical reference elements to facilitate optical alignment with reference to the projection optics. In this case, the parameters stored within the personality memory are based at least in part on the standardized optical configuration.

As noted above, the invention is particularly applicable to cathodochromic CRT systems wherein the CRT assembly includes a cathodochromic image target upon which an image is written by an electron beam of relatively low intensity and which is erased by an electron beam of relatively higher energy density for causing sufficient heating of the cathodochromic image target. In this case, the parameters stored within the personality memory include a set of parameters applicable to a writing mode, and a set of parameters applicable to an erase mode. Notably, the set of parameters applicable to the erase mode includes parameters for determining the energy density of the electron beam spot.

The parameters stored within the personality memory may take either or both of several general forms. In one form, the parameters include absolute data describing signal magnitudes for driving the deflection and focus elements of the CRT at each of a plurality of predetermined screen positions. In the case of a CRT assembly where the deflection and focus elements comprise electromagnetic coils, these parameters include absolute data describing current magnitudes for driving the deflection and focus coils at each of a plurality of predetermined screen positions. A personality memory of this particular form facilitates self-calibration of the overall system including both the CRT subsystem and the display electron subsystem, despite sample variations in both.

A typical display electronic subsystem comprises a polynomial expansion function generator for driving the deflection and focus elements of the CRT assembly as predetermined functions of a set of constants and of screen positions. In this case, the parameters stored with the personality memory may include constant coefficient values for the polynomial expansion function generator. Alternatively, an iterative self-adjustment procedure can be employed to calculate the constant values from the current magnitudes at various screen positions as stored in the personality memory. While an analog polynomial expansion function generator is disclosed herein, an all-digital architecture may also be employed in the practice of the invention, with correction values calculated using parameters stored in the personality memory.

BRIEF DESCRIPTION OF THE DRAWINGS

While the novel features of the invention are set forth with particularlity in the appended claims, the invention, both as to organization and content will be better understood and appreciated, along with other objects and features thereof, from the following detailed description, taken in conjunction with the drawings, in which:

FIG. 4 is a block diagram of the analog front end portion of FIG. 2.

DETAILED DESCRIPTION

Figure 1:
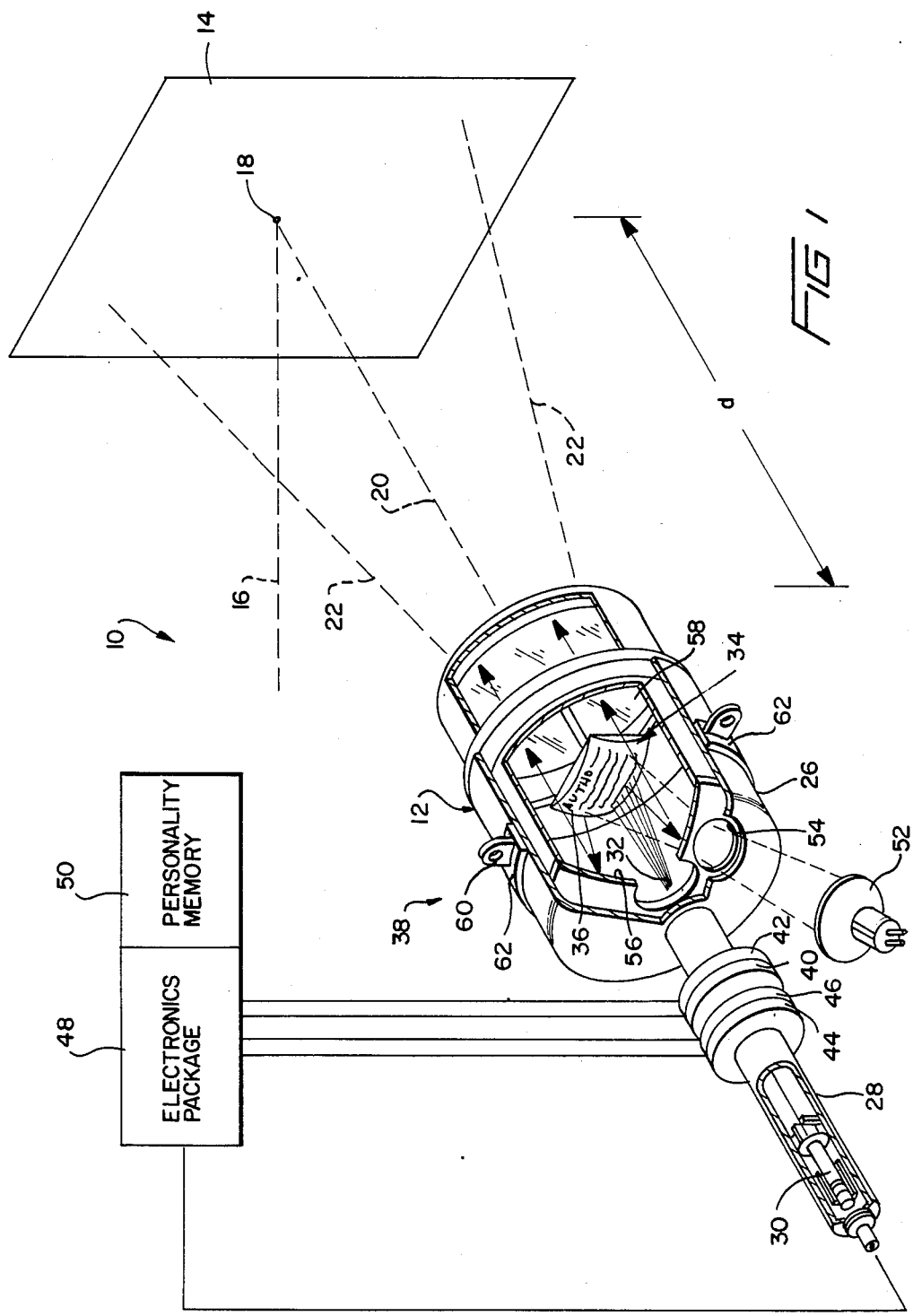
FIG. 1 is a schematic depiction of a display system in accordance with the invention, including a cathodochromic CRT projection tube.

Referring first to FIG. 1, a CRT-based system, generally designated 10, is provided for presenting an aligned visual display. The particular system 10 is a projection system employing a cathodochromic CRT projection tube 12 for projecting an image on a viewing screen 14. However, it will be appreciated that, while the invention is advantageously employed in a cathodochromic CRT projection system, neither a cathodochromic CRT nor a projection system are necessary in the practice of the invention in its broader aspects. The system 10 is intended for high-resolution (e.g. 2048×2048 pixel) high quality single images, such as documents and graphics, which may be presented and discussed, for example, during a teleconferencing meeting.

In FIG. 1, an imaginary line 16 is shown extending perpendicularly from an approximate central point 18 of the viewing screen 14, and another imaginary line 20 extends along the optical axis of the cathodochromic CRT projection tube 12, intercepting the line 16 at the point 18. Light rays from the cathodochromic CRT projection tube 12 in general are represented by lines 22.

In the particular geometry of FIG. 1, it will be seen that the optical axis 20 is at an angle with respect to the perpendicular line 16, which angle may be referred to as the projection angle. FIG. 1 more particularly represents the situation where the cathodochromic CRT 12 is included within a floor mounted cabinet structure (not shown) and projects upwardly toward a wall mounted viewing screen 14. Under such conditions, it will be appreciated that, unless compensated, "keystoning" of a nominally rectangular projected image occurs whereby the image is wider at the top than at the bottom. Overall alignment of the system to project an undistorted image requires that this geometrical consideration, as well as others associated with the particular projection optics, be taken into account.

Considering the cathodochromic CRT projection tube 12 in greater detail, the tube 12 is preferably of the general form disclosed in the above-identified Todd, Jr. U.S. Pat. No. 3,959,584, the entire disclosure of which is hereby incorporated by reference. The cathodochromic CRT 12 includes an enlarged housing portion 26 with an integral neck portion 28. Within the neck 28 is an electron gun 30 which generates an electron beam 32 of controlled intensity directed toward a cathodochromic image target 34 having a rear surface 36 coated with a suitable cathodochromic power, such as a sensitized bromine sodalite, $Na_6Al_6Si_6O_{24}2(1-z)NaX$, wherein z is is the fraction of NaX vacancies formed by hydrogen annealing and X is Br or a mixture of Br and OH. A process for preparing such a cathodochromic sodalite is disclosed in Todd, Jr. et al U.S. Pat. No. 3,932,592. As described in Todd, Jr. U.S. Pat. No. 4,959,584, preferably there is an underlying thermal buffer layer between the sensitized sodalite and the underlying support.

As noted above, in contrast to photoluminescent phosphors, cathodochromic materials do not emit light. Rather, they change color when excited by an electron beam. In the case of cathodochromic bromine sodalite, the resultant coloration remains indefinitely, until deliberately erased. In addition to inherent memory, cathodochromic image targets have the properties of high resolution, and high contrast in bright ambient light making them highly suitable for projection systems. Erasure is normally effected by heating to about 300° C. An economical and technically feasible method erasure is electron beam heating, wherein the image screen 34 is scanned, in a raster pattern, with an electron beam exposure such that temperature is raised above an erase threshold.

The cathodochromic CRT 12 is one element of an overall CRT assembly 38, which additionally includes permanently affixed X- and Y-axis electromagnetic deflection coils 40 and 42 of conventional construction, as well as electromagnetic static and dynamic focus coils 44 and 46, respectively. Although not specifically shown in FIG. 1, there typically are other components affixed to the CRT 12, such as beam centering magnets and astigmatism correctors. While electromagnetic focus and deflection are depicted, the invention is equally applicable to electrostatic focus and deflection systems. Significantly, the CRT assembly 38 itself has no field-adjustable parts.

The electron gun 30, and the coils 40, 42, 44, and 46 are each driven by circuitry within an electronics package 48 to effect the desired scanning, focusing and intensity control of the electron beam 32. Electrically included with the electronics package, in a manner described in greater detail below with reference to FIGS. 2 and 3, is a personality memory 50 having stored parameters specifically applicable to the particular CRT assembly 38.

For displaying an image written on the image target 34, light from a suitable light source, such as a xenon lamp 52 is directed through a suitable windowed aperture 54 to illuminate the image target rear surface 36. Light reflected from the rear surface 36 is collected by a spherical projection mirror 56 and reflected forwardly through a glass face plate 58 generally towards the viewing screen 14. As indicated, the light is projected through a suitable optical projection lens system 59 which includes a Schmidt correction lens to correct for spherical aberations in a known manner.

The projection optical system of FIG. 1 is of a standardized optical configuration whereby the cathodochromic CRT projection tube 12 is precisely located with reference to the optical system 59 and with reference to the viewing screen 14. The standardized optical configuration includes precise adjustment of the distance between the projection tube 12 and the viewing screen 14, represented as distance d. To facilitate optical alignment with the reference to the projection optics, the projection tube 12 includes mechanical reference elements represented at 60. Typically, these reference elements 60 comprise a set of four mounting tabs parallel to the faceplate and spaced a fixed distance therefrom, and are secured to the CRT by means of a band or girdle 62. The reference elements 60 engage portions of the cabinet structure (not shown) to precisely locate the projection tube 12.

Figure 2:
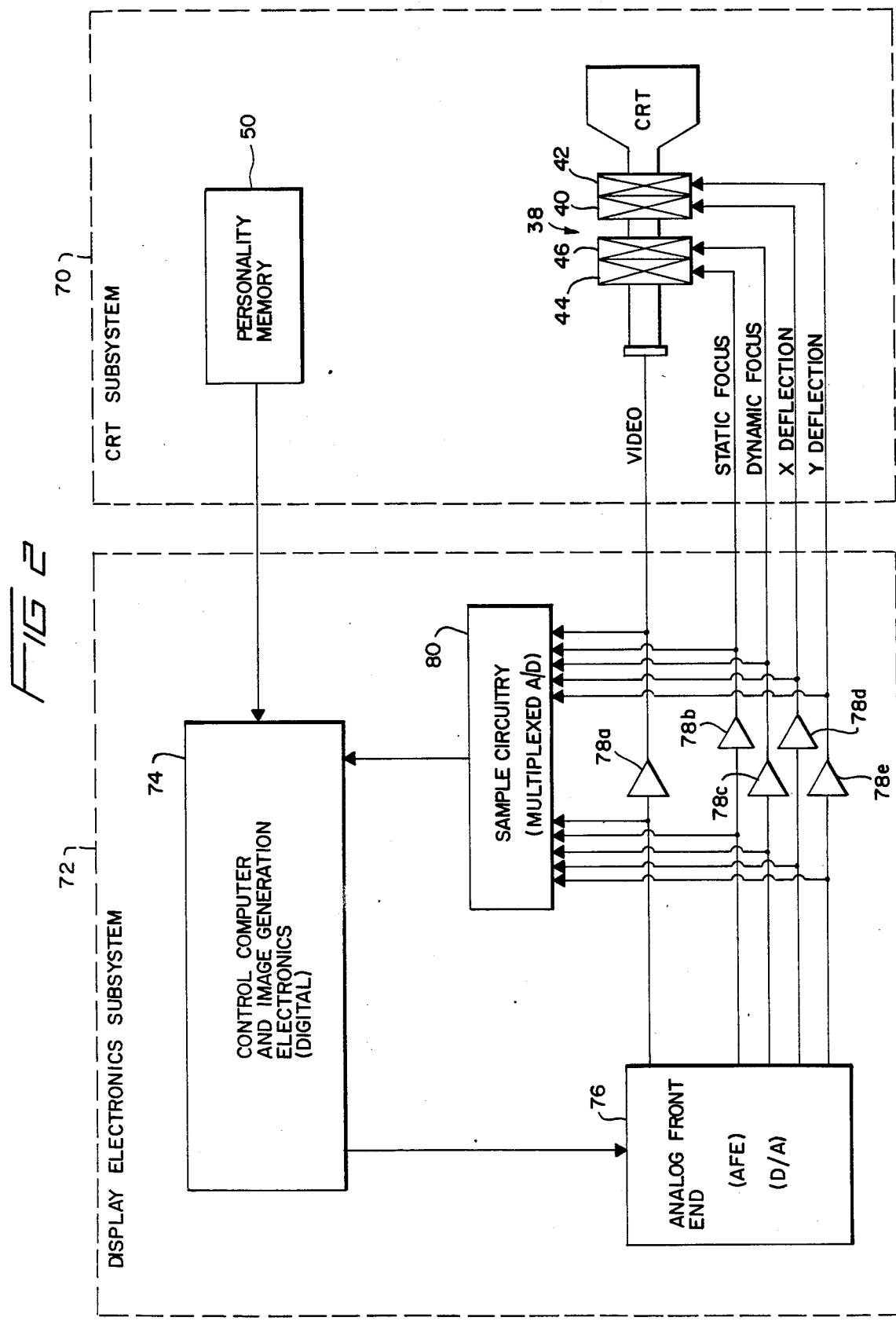
FIG. 2 is an overall block diagram depicting the logical organization of major portions of the FIG. 1 projection display system, but not necessarily reflecting the physical arrangement.
Figure 3:
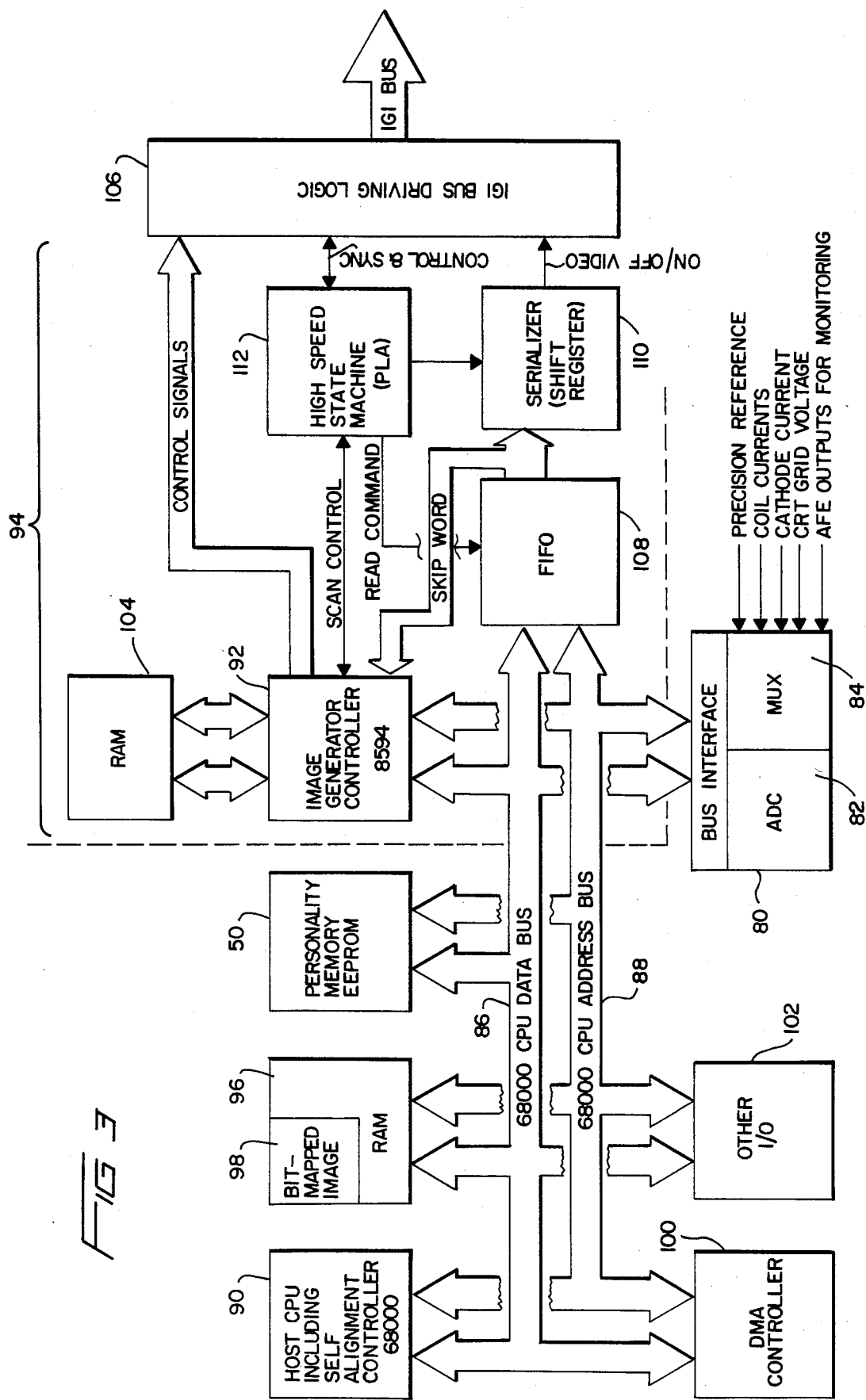
FIG. 3 is a block diagram depicting portions of the display electronic subsystem of FIG. 2 and the electrical connection to the personality memory in greater detail.

With reference now to FIG. 2, the overall system is logically organized as a CRT subsystem 70 and a display electronics subsystem 72. This logical organization does not, however, necessarily reflect the physical configuration. The personality memory 50 is logically a part of the CRT subsystem 70, but electrically is accessed by the display electronics subsystem. In actual implementations, the personality memory comprises a PROM such as an EPROM or an EEPROM physically plugged into a suitable socket within the display electronics subsystem.

In the exemplary embodiment disclosed herein, the display electronics subsystem 72 includes control computer and image generation electronics (digital) 74, described in detail hereinbelow with reference to FIG. 3, and an analog front end 76, described in detail hereinbelow with reference to FIG. 4. Outputs of the analog front end 76 drive control elements of the CRT 12 through suitable power amplifiers 78a through 78e. In an exemplary system, the power amplifiers 78b through 78e provide controllable current drive of ±4 amperes to the corresponding coils 44, 46, 38 and 40. The power amplifier 78a is a video amplifier providing voltage drives to the cathode and control grid of the CRT 12. In order to provide feedback to compensate for aging and variation in such components as the power amplifiers 78a through 78e, in a manner described hereinbelow, sample circuitry 80 is provided, which, as may be seen in FIG. 3, comprises a precision A/D converter 82 and an input multiplexer 84. These together serve to sample various currents and voltages during operation of the system.

Referring now to FIG. 3 in detail, shown is an exemplary organization of those elements of FIG. 2 which generally comprise the display electronics subsystem 72, including suitable electrical connections to the personality memory 50 within the CRT subsystem 70.

While any one of a variety of architectures may be employed, preferably the system 72 is microprocessor based and includes a conventional bus structure for communication among various elements. In particular, there is a data bus 86 and an address bus 88, which may also include a control bus, not specifically shown. Connected to and generally controlling the busses 86 and 88 is a suitable microprocessor 90, such as a Motorola Type No. MC68000.

An important subsidiary processor is an image generator controller 92 which, together with various elements connected to it and operating under its control, comprises an image generator 94. In general, the image generator 94 is a high speed dedicated subsystem that generates signals to deflect the electron beam along the X- and Y-axes, while modulating the electron beam to produce an image. The image is stored in a digital memory that may be integral to the image generator or, as in the illustrated embodiments, in a general system memory 96 that the image generator 94 has priority high speed access to. The format of the image in memory may be of many forms, such as character, vector or bit map, and in the disclosed embodiment is a bit-mapped image 98. It will be appreciated that the format of image in memory and the complexity of the image generator 94 function are of no concern insofar as the basic principles of the invention are concerned. For purposes of example, a simple one bit per pixel bit map graphic image generator is discussed.

Briefly considering other elements on the data and address busses 86 and 88, to facilitate data flow a DMA controller 100 is included, which permits high speed data transfers without tying up CPU time. An Hitachi Type No. HD68450 DMA controller is suitable.

Depicted in generalized form is a port 102 for "Other I/O", which represents an interface to external systems, such as systems for defining an image to be displayed.

As noted above, the image to be displayed is stored in conventional fashion as the bit-mapped image 98 in the random access memory (RAM) 96, which typically comprises a one bit per pixel dynamic random access memory (DRAM). The image could just as easily be stored as vectors or character codes. The image to be displayed and stored in bit-mapped form can be developed from any suitable external source and communicated via the interface 102 into the image memory 98, employing the busses 86 and 88. In typical applications, the image comprises text, graphics, pictures, or a combination. By way of example and not limitation, via a telephone line interface and a suitable decoder (not shown) the image may be derived from a conventional facsimile transmission, and decoded into the bit-mapped image. The image may be locally generated employing a digital scanner. Alternatively, the system may be employed as a display terminal which accepts ASCII character data and converts it to suitable image representations within the image memory 78. All of these functions, as well as others, can be accomplished employing conventional techniques.

Also depicted in FIG. 3 is the manner in which the sample circuitry 80 comprising the A/D converter 82 and input multiplexer 84 is connected to the data and address busses 86 and 88. As indicated, analog inputs to the sample circuitry 80 include a precision reference voltage for calibration purposes, CRT deflection coil currents, CRT cathode (electron beam) current and grid voltage, as well as various outputs of the analog front end 76.

The image generator 94 of FIG. 3 will now be considered in somewhat greater detail. At the outset, it may be noted that the alignment functions of the present invention may be distributed, as they are in the disclosed embodiment as a matter of convenience, or may reside in either the host CPU 90 or the image generator controller 92 alone. In practice, the image generator controller 92 is preferably a special high speed processor dedicated to operating the display, and not having the general computing capability to perform the self alignment procedure. Since most display systems contain at least a general purpose microprocessor and the self alignment is generally only done as part of a system power up sequence, a dedicated general purpose microprocessor would not normally be used.

It should also at the outset be noted that the designs of the FIG. 3 image generator 94 and the FIG. 4 analog front end (AFE) are interdependent and may be altered considerably, particularly at the interface between the two subsystems. The examples used are for a scanned bit map graphics system, and would be different in a vector system.

To implement the image generator controller 92, a Zilog Type No. 8594 "Universal Peripheral Controller" is employed. The 8594 is a specialized processor which appears to the 68000 host CPU 90 as twenty registers in the 68000 address space. The host CPU communicates indirectly with the FIG. 4 analog front end through these twenty registers.

Connected to the 8594 controller 92 is a RAM 104 in which program and data are stored, during operation. Upon system reset, it is a characteristic of the 8594 that it expects data (including program and parameters) to be uploaded through selected ones of its twenty registers into the RAM 104. Thus, as a part of the system intialization procedure, the host CPU 90 uploads this data from the personality memory 50 into the RAM 104, which accordingly then has a copy of the "personality" data from the EEPROM 50. This data includes all of the necessary parameters for operating a particular CRT 12 (FIGS. 1 and 2) and for calibrating the overall system with reference to the particular CRT 12 in the manner described hereinbelow.

The image generator 94 communicates with the FIG. 4 analog front end via a bus termed the "IGI BUS" driven by IGI Bus Driving Logic 106. The IGI BUS is a simplified control bus for causing the loading of various registers in the analog front end circuitry 76 with digital values at appropriate times. The Bus Driving Logic 98 includes conventional elements such as latches and buffers, and could be implemented, for example, employing conventional Parallel Input/Output (PIO) devices compatible with the processor 92.

To provide ON/OFF video at a pixel clock rate of 10 MHz, corresponding to a period of 100 nanoseconds, a sixteen bit-wide first-in-first-out (FIFO) memory 108 is connected to the address and data busses 86 and 88 to receive image data, and a serializer 110 is connected to the output of the FIFO 108. Operation of the FIFO 108 and serializer 110 is coordinated by a high speed state machine 112, implemented in a programmable logic array (PLA), which simply acts as a high speed clock and timing generator, under the overall control of the controller 92. The controller 92 has a connection (not shown) to the DMA controller 100 to cause image data to be transferred at high speed from the bit-mapped image memory 98 to the FIFO 108 until the FIFO is full. This architecture permits the use of a slower but wider RAM 96 for the bit map 98 which can be read at conventional speeds since multiple pixels are read at one time, while at the same time accommodating relatively high speed pixel output. These particular elements and their operation are described in somewhat greater detail hereinbelow following a description of the analog front end of FIG. 4.

During electron beam erase operation image data is not relevant, and the input to the serializer is forced to a logic "1".

With reference now to FIG. 4, the analog front end 76 generally comprises a digital to analog interface section 200 and a polynomial expansion function generator section 202 which accepts X and Y digital position coordinate data, and applies appropriate geometry correction to generate drive signals for the focus and deflection elements of the CRT 12. In general, the analog front end 76 may be described as an integrated digital to analog control board which drives the cathodochromic CRT display tube 12. The analog front end 76 provides functions such as electron beam positioning, focusing and control of video drive levels.

An important hardware device, a number of which are employed in the analog front end 76, is a multiplying digital to analog converter (MDAC). A suitable MDAC is an Analog Devices Type No. AD7524, which includes an 8-bit data register. Each MDAC has an analog input and an analog output. The output voltage (assuming current-to-voltage conversion as required) is equal to the input voltage multiplied by an attenuation factor determined by the value stored in the 8-bit register. The MDAC registers are connected to the IGI bus, and individually addressed via suitable address decoding circuitry (not shown). In the symbology of FIG. 4, each MDAC is represented by a box having a term in parenthesis, which represents the coefficient value stored in the register, as communicated through the IGI bus in a conventional manner. The coefficients stored in the various MDAC registers are referred to at some points hereinbelow as "AFE parameters", particularly in the context of the alignment process. Several of the MDACs used to provide offsets have an analog input represented as "1.0", which designates simply a fixed reference voltage such that the output of the particular MDAC directly represents the register value times the reference voltage.

Considering the digital-to-analog interface section 200 in greater detail, for receiving the digital position data, an X-counter/latch 204 and a Y-counter/latch 206 are provided and appropriately connected to the IGI bus. Conveniently, each of the counter/latches 108 and 110 comprises an 11-bit counter which can be configured to count in an up or down mode. Considering the X-channel, for example, this allows the display to be conveniently scanned from left to right or right to left.

Immediately following the X-counter latch 204 is a digital-to-analog converter 208 for the X channel, and a similar digital-to-analog converter 210 for the Y channel follows the Y counter 210. The output of the X DAC 208 is an analog representation of a desired X-axis position, and is applied to various points within the polynomial expansion function generator section 202 as indicated. Although not specifically shown, it will be appreciated that level converters and linear current-to-voltage converters are included where required, depending upon the particular components selected.

The output of the Y DAC 210 is similiarly an analog representation of a desired Y-axis position. For proper compensation, an offset Y-axis representation, Y', is required, as well as inverted offset Y-axis representation, Y'. To generate these, an analog summation element 212 is provided having its inputs connected to the Y signal and to the output of an MDAC 214 outputting a representation of a value INITIAL Y OFFSET, and having its output connected to an inverter 216. The INITIAL Y OFFSET register aids in alignment since the electrical center of the image target and the physical center are not the same.

Also connected to the IGI bus is a 12-bit digital-to-analog converter (DAC) 218 for providing a STATIC FOCUS signal. An internal register (not shown) within the static focus DAC 218 is loaded with a constant value for the particular mode of operation. As previously described, different focus values are employed for writing and erasure. The output of the DAC 218 is connected through a suitable line driver (not shown) and then through the FIG. 2 power amplifier 78b to drive appropriate control elements of the CRT 12, specifically, the static focus coil 44.

A video amplifier 220 is included, the output of which is connected in a conventional manner to the cathode and control grid of the CRT 12. In the system depicted, no gray scale is employed, and individual pixels are either OFF or ON. The drive level for an ON pixel, and also drive level for electron beam erase, is established by the signal level applied to an analog input 222 of the video amplifier 220. This input is supplied by another 12-bit DAC 224, comparable to the DAC 218. To complete the video drive circuitry, the ON/OFF video drive line from the FIG. 3 serializer 110 is connected to a BLANK/UNBLANK input 226 of the video amplifier.

It will be appreciated that this video circuitry is exemplary only. For example multi-level (gray scale) video can be provided by combining the outputs of a relatively fast DAC for modulation and a relatively slower but larger DAC for establishing a base level. The base level would be one of the calibration parameters.

The function generator section 202 of FIG. 4 in general generates the geometry correction polynomials which dynamically vary as a function of X and Y screen positions.

More particularly, the geometry correction polynomial for the X channel is as follows:

$$XDEFL = D\ (X + AX^3 \pm BXY' + CXY'^2 + XOFFSET)$$

The coefficients A, B, C, D and XOFFSET are employed as constants, while X and Y' are the screen position data. These coefficients are related to conventional geometry correction terminology as follows:

| Coefficient | Purpose |
| --- | --- |
| A | X-Edge compression |
| B | X-Keystone |
| C | X-Pincushion |
| D | X-Gain |
| XOFFSET | X-Offset |

It may be noted that the X-Keystone coefficient can be either positive or negative and is user selectable for either a floor standing or a ceiling mounted projector.

From FIG. 4, it will be seen that the above-polynomial for XDEFL is generated by the elements within a function generator 228.

The geometry correction polynomial for the Y channel is similar, and is as follows:

$$YDFFL = H\ (Y + EY^3 \pm IFY'^2 + GYX^2 + YOFFSET)$$

Again, the coefficients E, F, G, H and YOFFSET are employed as constants, and are related to conventional geometry correction terminology as follows:

| Coefficient | Purpose |
| --- | --- |
| E | Y-Edge compression |
| F | Y-linearity |
| G | Y-Pincushion |
| H | Y-Gain |
| YOFFSET | Y-Master Offset |

In FIG. 4, the above polynomial for YDEFL is generated by elements within a function generator 230.

Following the function generators 228 and 230 are suitable drivers (not shown) for driving the FIG. 2 power amplifiers 78d and 78e.

For dynamic focus, a polynomial function generator 232 generates the function:

$$DF\ DEFL = I\ (X''^2 + Y''^2 + DFOFFSET)$$

where
$X'' = X + DF\ XOFFSET$ and
$Y'' = Y + DF\ YOFFSET$

Thus, the dynamic focus circuitry comprising the function generator 232 provides correction modulation for modifying focus at the edges of the screen. This correction is position dependent and is derived from a sum of squares of the deflection signals with an offset to adjust for no dynamic focus at the electrical center of the target.

It will be appreciated that the polynomial coefficients described above are a subset of a more complete geometry correction polynomial, and that additional terms can be added. The following table identifies a more complete set:

| Correction Term | Effect On X Axis | Effect On Y Axis |
| --- | --- | --- |
| X | Size | Tilt |
| Y | Tilt | Size |
| $X^2$ | Linearity | Bow |
| $Y^2$ | Bow | Linearity |
| XY | Trapezium | Trapezium |
| $XY^2$ | Pinchusion | Edge Tilt |
| $X^2Y$ | Edge Tilt | Pinchusion |
| $X^2Y^2$ | Edge Bow | Edge Bow |
| $X^3$ | Edge Compress | S-Tilt |
| $Y^3$ | S-Tilt | Edge Compress |

Although the deflection system described in detail is a linear one as is presently preferred, it will be appreciated that the invention is equally applicable to nonlinear (flyback type) deflection systems. It will be similarly appreciated that the invention can be applied to a multiple gun color display system.

The manner in which the image generator 92 of FIG. 3 and the analog front end of FIG. 4 operate together to drive the display will now be considered. To begin a scan line, the CPU 92 sets the X- and Y-registers 204 and 206, and then triggers a cycle of the high speed state machine, which cycles at a rate of 10 MHz through n sets of 16 states each to generate appropriate timing signals for a scan line containing n × 16 pixels. Included in the control lines is an XCLOCK signal, which clocks the X COUNTER/LATCH 204 to drive the electron beam horizontally at a constant rate. At the same time, data is clocked from the shift register 110 into the video amp 220, the shift register 110 having been loaded from the FIFO 108. The shift register 110 can hold 16 bits at a time. To reload the shift register 110 so that video can continue uninterrupted, at the 13th clock pulse, a FIFO 108 read cycle is initiated. The FIFO 108 comprises Mostek Type No. MK4501 devices, and the shift register 110 comprises video shift registers. These devices are intended to operate together in this manner.

While the shift register 110 is reading data from the FIFO 108, the DMA controller 100 reads 16-bit words from the bit-mapped image RAM 98 and loads them into the FIFO 108.

At the conclusion of a scan line, the image generator controller 92 sends a "count done" signal, and the serializer 110 completes its current cycle. At this point, a "skip word" is available to the image generator controller 92, as described in detail in the above-incorporated related application Ser. No. 788,838.

The description up to this point has primarily been directed to the major hardware elements employed in the practice of the invention. What follows is directed primarily to the operation.

For reasons noted in the "Background" above, alignment of certain CRT display systems, particularly those employing cathodochromic projection CRTs, is relatively complex, and is best done by experienced personnel employing proper equipment. A significant aspect of the invention is that all major CRT alignment can be performed at a factory or other centralized location. For convenience, such complex alignment is referred to hereinafter as "factory" alignment, wherever the actual location, leaving only relatively simple adjustments, if any, for the "field".

Thus, at the "factory", a standarized CRT subsystem 70 is developed during a quality control and setup procedure, the standardized subsystem comprising a CRT assembly 38 and a personality memory 50 specifically applicable to the CRT assembly 38 on an individual basis. The equipment at the "factory" includes a physical system like that generally depicted in FIG. 1, which defines a standardized optical configuration. The "factory" electronics package effectively duplicates that which is described hereinabove, but is enhanced through additional computer control capability in what may be viewed as the external system 92, and the lack of dependence on parameters stored in advance in a personality memory. Rather, the "factory" alignment procedure determines what should be stored in a personality memory. The "factory" equipment also includes a suitable ROM programmer.

Factory geometry correction is primarily a visual one, employing a square grid-like test pattern. The various AFE parameters, including those for static and dynamic focus, are iteratively adjusted in a conventional manner until a linearly uniform undistorted image is produced. It will be appreciated that the resultant AFE parameters reflect the manufacturing variations of the particular CRT assembly 38, including the drive charateristics of its particular coils, as well as the geometry of the standardized optical configuration depicted in FIG. 1.

A cathodochromic CRT projection system has at least two modes of operation, a writing mode and an erase mode, requiring different AFE parameters. In addition, there preferably are several writing modes, for example for vertically-oriented raster-scanned images, for horizontallyoriented raster-scanned images, and for random-access pointplotting modes. Each of these modes requires at least some different AFE parameters. In particular, images must be written to slightly different (although overlapping) areas of the image screen 34 in order to properly fill the viewing screen 14 for each mode. For erase mode, the entire image target 34 should be scanned, including border regions outside normal image areas, and this requires a different geometry correction. The erase mode in addition requires different electron gun drive and focus, as the electron beam is preferably slightly defocused for erase, and is adjusted for uniform energy density.

By way of summary, the following is a list of seventeen AFE parameters determined for each of the operating modes.

| | |
|---|---|
| X-PINCUSHION | Y-PINCUSHION |
| X-EDGE COMPRESSION | Y-EDGE COMPRESSION |
| X-KEYSTONE | Y-LINEARITY |
| X-OFFSET | Y-MASTER OFFSET |
| X-GAIN | Y-INITIAL OFFSET |
| | Y-GAIN |
| DF-XOFFSET | DF-MASTER OFFSET |
| DF-YOFFSET | DF-GAIN |
| STATIC FOCUS LEVEL | VIDEO DRIVE LEVEL |

While the above seventeen AFE parameters alone are sufficient information to remove sample variations from a CRT assembly 38 in the sample configuration, and also to reflect the standard geometrical configuration, they are not sufficient to remove sample variations in the analog front end 76 circuitry and the deflection power amplifiers 78a through 78e. As far as the CRT assembly 38 is concerned, what is most directly pertinent is not the seventeen AFE parameters; rather it is the current drive to each of the deflection and focus coils required at each point on the screen. Thus, coil current required to deflect a properly-focused beam to each of a plurality of sample points is determined. Thirteen display screen 14 points for geometry correction are defined as follows:

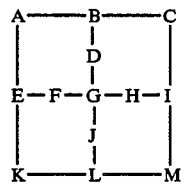

Deflection current data for both the X and Y deflection are determined for all coordinates. The digital coordinates that give zero deflection on both axis are determined by successive digital coordinate adjustments and samples of the current in the respective deflection coil. These values are the on-axis zero current digital coordinates that will be used for determining the zero current when the tube is in use out in the field. The following list is the set of coordinates required to perform tube alignment:

| | |
|---|---|
| A (0,0) | H (2047,yzero) |
| B (xzero,0) | I (1563,yzero) |
| C (2047,0) | J (xzero,1536) |
| D (xzero,512) | K (0,2047) |
| E (0,yzero) | L (xzero,2047) |
| F (512,yzero) | M (2047,2047) |
| G (xzero,yzero) | |

A total of eighteen currents are determined for geometry correction, as defined in the following table. Some of the currents are stored as measured values (indicated as "Val" in the Table) values, while others, in order to minimize the amount of data stored, are stored as current differences (indicated as "Diff" in the Table). The differences are the differences in the current values at the two points indicated in each case. It will be appreciated that this particular set of current values and differences is exemplary only.

| STORED CURRENT DIFFERENCES AND VALUES | | |
|---|---|---|
| Name | Current | Points |
| X-PINCUSHION | Ix Diff | K and M |
| X-EDGE COMP. | Ix Diff | E and F |
| X-KEYSTONE | Ix Diff | A and C |
| X-OFFSET | Ix Val | |
| X-GAIN | Ix Diff | E and I |
| DF-XOFFSET | Idf Diff | E and G |
| DF-GAIN | Idg Val | I |
| STATIC FOCUS | Isf Val | |
| X-DIGITAL ZERO | X DAC Setting for 0 current on X | |
| Y-PINCUSHION | Iy Diff | A and K |
| Y-EDGE COMP. | Iy Diff | B and D |
| Y-LINEARITY | Iy Diff | B and G |
| Y-MAS-OFFSET | Iy Val | |
| Y-GAIN | Iy Diff | B and L |
| DF-YOFFSET | Idf Diff | B and G |
| Y-DIGITAL ZERO | Y DAC Value for 0 current on Y | |

When all seventeen AFE parameters, and all eighteen current difference and current values for geometry correction have been determined for each mode, they are all stored in the personality memory 50 which, as noted above, is a non-volatile PROM such as an EPROM or an EEPROM. Preferably, the same PROM also contains the programming for the image generator controller 92, which is uploaded from the memory 50 to the RAM 104 as a part of system initialization.

Although not illustrated, additional data can be stored in the personality memory 50 which concerns a particular CRT 12. Examples include the number of times the image should be written to build image contrast for that particular CRT, exposure and delay for point-to-point writing, and retrace delays for the CRT assembly, including the coils. In addition, points from an ageing curve can be included, as well as a temperature versus time relationship so that erase energy can be decreased when it can be assumed that the image target is hot from continuous operation for a period of time.

When the thus-standardized CRT subsystem 70 comprising the CRT assembly 38 and the personality memory 50 is subsequently transported to a field location and mated with a display electronics subsystem 72, all of the information is present to enable duplication of the undistorted image that the CRT tube had when originally calibrated at the factory. Ideally only the AFE parameters determined during visual alignment at the factory and stored in the personality PROM will be needed to display an undistorted full screen image.

Thus, in one approach, the seventeen AFE parameters are read out of the personality memory 50, and loaded into the analog front end 76 coefficient registers. Assuming the deflection power amplifiers 78a through 78e and the analog front end 76 are all properly calibrated, an undistorted image will be produced.

However, as noted above, it is desirable to align to the current values determined during the "factory" alignment procedure, rather than the AFE parameters, in order to compensate for variations in the power amplifier 78a through 78e, and in the analog front end 76. Under these circumstances, the AFE parameters are used in a subsidiary manner to provide a starting point to reduce the number of iterations required, to minimize the possibility of an iterative adjustment procedure momentarily using values which would cause damage, and for providing a check on the reasonableness of the iterative results.

More particularly, the following is one example of an iterative adjustment procedure which may be employed. It will be appreciated that the following is, in effect, a program flowchart expressed in somewhat greater detail than a drawing flowchart. The program represented by the following is executed by a CPU, such as the CPU 90, within the display electronics subsystem:

1. Before any system measurements can be made the ADC 82 in the sampling circuitry 80 is calibrated to a precision reference. For example, a precision 5.0 volt reference may be employed. The calibration yields a correction factor that is used to normalize ADC readings before they are used in each of the following steps.

2. To provide a reasonably close starting point for the self alignment and calibration procedure, all registers in the AFE are loaded with the nominal values stored in the personality PROM memory 50.

3. The ON-AXIS GC (Geometry Correction) is calibrated by the following procedure:

(a) The INITIAL Y-OFFSET read from the personality PROM in Step 2 above remains unchanged, and thus is not adjusted at all for self-calibrating.

(b) To set XGAIN (coefficient D) the values of the Ix at endpoints "E" and "I" of the table above are read. XGAIN is then expanded or decreased until the Ix current difference is the sames as the value stored in the personality PROM for the XGAIN magnitude.

(c) X-OFFSET is then set by loading the digital value of the X-DIGITAL ZERO into X DAC 208 and adjusting the offset until no Ix current flows.

(d) X-EDGE-COMPRESSION (coefficient A) is then adjusted by matching the Ix current differences between points "E" and "F" to the difference stored in the personality PROM.

(e) To set YGAIN (coefficient H) the values of Iy are read at both endpoints "B" and "L". YGAIN is then expanded or decreased until the Iy current difference is the same as the value stored in the personality PROM for the YGAIN magnitude.

(f) Y-MASTER OFFSET is then set by loading the digital value of the Y-DIGITAL ZERO into the Y DAC 210 and adjusting the offset until no Iy current flows.

(g) Y-EDGE COMPRESSION (coefficient E) is then adjusted by matching the Iy current difference between points "B" and "D" to the difference stored in the personality PROM.

(h) LINEARITY (coefficient F) is then adjusted until the difference in Iy current between points "B" and "G" is the same as the difference stored in the personality PROM.

The above process of steps (b) through (h) is repeated iteratively until a cyclic pass is completed with a predetermined minimum number of GC changes allowed is performed, or fewer.

4. OFF-AXIS GC is then self-adjusted as follows:

(a) X-KEYSTONE is adjusted until the Ix current difference between points "A" and "C" is identical to the value stored in the personality PROM.

(b) X-PINCUSHION (coefficient C) is adjusted until the Ix current difference between points "K" and "M" is identical to the value stored in the personality PROM.

(c) Y-PINCUSHION (coefficient G) is adjusted until the Iy current difference between points "A" and "K" is identical to the value stored in the personality PROM.

The above process of steps (a) through (c) is repeated iterataively until a cyclic pass is completed with the minimum number of GC changes allowed is performed, or fewer.

5. Dynamic Focus parameters are then set by the DF-XOFFSET, DF-YOFFSET, DFOFFSET, and DFGAIN adjustments:

(a) Dynamic Focus parameters are adjusted by loading the digital value for zero Iy. DFGAIN and DF-OFFSET are then adjusted to give the magnitude and zero Idf positions stored in the PROM for points "I" and "G" respectively.

(b) DF-XOFFSET is then adjusted until the Idf current difference between points "E" and "G" are identical to the value stored in the personality PROM.

(c) DF-YOFFSET is then adjusted until the Idf current difference between points "B" and "G" are identical to the value stored in the personality PROM.

Again the above process is repeated iteratively until a cyclic pass is completed with the minimum number of GC changes allowed is performed or fewer.

6. Static Focus is adjusted and matched exactly by reading the static focus sense signal and comparing the read value to the required value and adjusting appropriately.

7. Video drive levels are measured by sampling the Ik sense signal during erasure or during an "all bits ON" horizontal line at a normal scan rate.

Once the foregoing procedure is complete (for a particular mode), the system is fully and automatically aligned. It will be appreciated that the foregoing procedure can be executed in a second or so, especially with the AFE parameters as starting points for iteration. Moreover, the procedure, or parts of it, can be done automatically at periodic times during operation to compensate for component drift.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A CRT based system for presenting an aligned visual display, said system comprising:
a replaceable standardized CRT subsystem including:
a CRT assembly including elements for electron beam control, said CRT assembly being subject to sample variations compared to others of the same type, and
a non-volatile personality memory having stored parameters specifically applicable to said CRT assembly on an individual basis; and
a display electronics subsystem electrically connected for reading parameters from said personality memory and for driving the elements of said CRT assembly while taking the parameters into account so as to generate a properly aligned display regardless of sample variations specific to said assembly.

2. A system in accordance with claim 1, which further comprises:
projection optics for projecting an image formed by said CRT assembly onto a viewing screen, said projection optics having a standardized optical configuration;
said CRT assembly including mechanical reference elements to facilitate optical alignment with reference to said projection optics; and
the parameters stored within personality memory being based at least in part on the standardized optical configuration.

3. A system in accordance with claim 1, wherein:
said CRT assembly comprises a cathodochromic image screen upon which an image is written by an electron beam of relatively lower energy density and which is erased by an electronic beam of relatively higher energy density for causing sufficient heating of said cathodochromic image screen; and wherein
the parameters stored within said personality memory include a set of parameters applicable to a writing mode, and another set of parameters applicable to an erase mode.

4. A system in accordance with claim 3, wherein:
said elements for electron beam control include elements for electron beam energy density control, and wherein
the set of parameters applicable to erase mode includes parameters for determining electron beam energy density.

5. A system in accordance with claim 1, wherein:
said CRT assembly comprises a cathodochromic image screen upon which an image is written by an electron beam of relatively lower energy density, and which is erased by an electron beam of relatively higher energy density for causing sufficient heating of said cathodochromic image screen; and wherein
the parameters stored within said personality memory include a set of parameters applicable to a writing mode, and another set of parameters applicable to an erase mode.

6. A system in accordance with claim 5, wherein:
said elements for electron beam control include elements for electron beam energy density control, and wherein
the set of parameters applicable to erase mode includes parameters for determining electron beam energy density.

7. A system in accordance with claim 1, wherein:
said elements for electron beam control include elements for electron beam focus and deflection; and wherein
the parameters stored within said personality memory include absolute data describing signal magnitudes for driving the deflection and focus elements of said CRT assembly at each of a plurality of predetermined screen positions.

8. A system in accordance with claim 1, wherein:
said elements for electron beam control include electromagnetic coils for electron beam focus and deflection; and wherein
the parameters stored within said personality memory include absolute data describing current magnitudes for driving said deflection and focus coils at each of a plurality of predetermined screen positions.

9. A system in accordance with claim 1, wherein:
said elements for electron beam control include elements for electron beam focus and deflection; wherein
said display electronics subsystem comprises a polynomial expansion function generator for driving the deflection and focus elements of said CRT assembly as predetermined functions of a set of constants and of screen position; and wherein the parameters stored within said personality memory include constant values for said polynomial expansion function generator.

10. A system in accordance with claim 1, wherein said elements for electron beam control include electrostatic deflection elements.

11. A replaceable CRT subsystem for use in a CRT based system for presenting an aligned visual display, said subsystem comprising:
a CRT assembly including elements for electron beam control, said CRT assembly being subject to sample variations compared to others of the same type; and
a non-volatile personality memory having stored parameters specifically applicable to said CRT assembly on an individual basis such that said CRT subsystem is standardized regardless of sample variations specific to said CRT assembly.

12. A CRT subsystem in accordance with claim 11, wherein:
said CRT assembly includes mechanical reference elements to facilitate optical alignment with reference to a projection optical system having a standardized optical configuration; and wherein
the parameters stored with said personality memory are based at least in part on the standardized optical configuration.

13. A CRT subsystem in accordance with claim 11, wherein:
said CRT assembly comprises a cathodochromic image screen upon which an image is written by an electron beam of relatively lower energy density and which is erased by an electron beam of relatively higher energy density for causing sufficient heating of said cathodochromic image screen; and wherein
the parameters stored within said personality memory include a set of parameters applicable to a writing mode, and another set of parameters applicable to an erase mode.

14. A CRT subsystem in accordance with claim 13, wherein:
said elements for electron beam control includes elements for electron beam energy density control; and wherein
the set of parameters applicable to erase mode includes parameters for determining electron beam energy density.

15. A CRT subsystem in accordance with claim 12, wherein:
said CRT assembly comprises a cathodochromic image screen upon which an image is written by an electron beam of relatively lower energy density, and which is erased by an electron beam of relatively higher energy density for causing sufficient heating of said cathodochromic image screen; and wherein
the parameters stored within said personality memory include a set of parameters applicable to a writing mode, and a set of parameters applicable to an erase mode.

16. A CRT subsystem in accordance with claim 15, wherein:
said elements for electron beam control include elements for electron beam energy density control; and wherein
the set of parameters applicable to erase mode includes parameters for determining electron beam energy density.

* * * * *